United States Patent Office 3,517,045
Patented June 23, 1970

3,517,045
HYDROXYALKYL QUATERNARY AMMONIUM ETHERS AS ANTISTATIC AGENTS
Peter Vincent Susi, Middlesex, and Frank Joseph Arthen, Jr., Franklin Township, Somerset County, N.J., assignors to American Cyanamid Company, Stamford, Conn., a corporation of Maine
No Drawing. Original application Oct. 15, 1965, Ser. No. 496,705. Divided and this application June 7, 1968, Ser. No. 742,117
Int. Cl. C07c *141/06*
U.S. Cl. 260—459
3 Claims

ABSTRACT OF THE DISCLOSURE

Stable polymeric compositions having improved antistatic properties are obtained by incorporating in a polymeric composition a hydroxyalkyl quaternary ammonium ether of the formula:

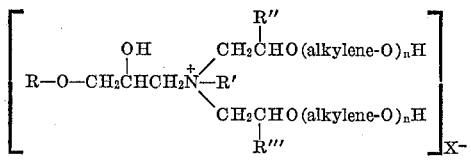

wherein R is aliphatic of from 8–19 carbon atoms or cycloalkyl of 5–6 carbons which may have alkyl substituents of 1–19 carbons; R' is lower alkyl of 1–3 carbon atoms; R'' and R''' are individually either hydrogen or lower alkyl of 1–4 carbon atoms; "alkylene" has 2–3 carbons; $n$ is a number between zero and ten; and X is an anion.

---

This application is a divisional of application Ser. No. 496,705, filed Oct. 15, 1965 now U.S. Pat. 3,445,440 issued May 20, 1969.

This invention relates to a method for imparting antistatic properties to polymeric compositions and, more particularly, to a method for minimizing the accumulation of static electricity in polymers such as polyolefins, vinyl chloride polymers, styrene polymers, acrylic polymers, etc. The method involves incorporating in the polymer a new compound represented by the following Formula I:

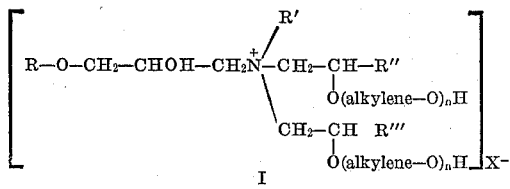

wherein R is an aliphatic radical of eight to nineteen carbon atoms (straight or branched) or cycloalkyl of 5–6 carbons which may have alkyl substituents of 1–19 carbons; R' is a lower alkyl radical of 1–3 carbons; R'' and R''' are either hydrogen or alkyl of 1–4 carbons; "alkylene" is a group of 2–3 carbons; and $n$ is a number between 0–10 inclusive; and X is an anion such as halide, nitrate, phosphate, methosulfate, fluoroborate, etc. It relates further to the polymeric compositions resulting from this method, and to the new compounds which are represented by Formula I.

Polymeric plastic compositions typified by polymers of monoolefins (e.g., homopolymers and copolymers of ethylene, propylene and butylene) tend to accumulate surface electric charges during fabrication, and, subsequently, during the life of the material. This is highly objectionable for a number of reasons. Charged bodies attract dust, and, depending upon conditions, may also cause other troublesome effects such as shock to the person contacting the charged material, radio interference, etc.

Various means have been proposed to overcome or minimize the accumulation of surface electric charges including surface application of various types of antistatic materials, e.g., quaternary ammonium salts. However, surface treatment is often of only temporary assistance. Application of a coating composition containing an antistatic agent, has also been proposed, but coating processes are costly and the effect is not permanent.

It has also been proposed to incorporate the antistatic agent into the plastic composition during either compounding, molding or fabrication steps. For practical purposes, an antistatic agent which is to be used by incorporation directly into the plastic, must fulfill certain requirements. To begin with, the agent must have sufficient antistatic activity when applied at feasible concentrations. Thus, the agent should be effective at low concentrations for reasons of economy and, in addition, to avoid impairing the properties of the polymeric substrate. The material must be compatible with the plastic composition and must be of such a nature that it can be easily incorporated during the conventional compounding and milling steps. The antistatic properties of the agent should be substantially permanent and should outlast exposure to high temperatures. Heat stability is especially important for use in polypropylene which must be heated to high temperatures to enable proper compounding, milling and molding thereof.

Materials have previously met certain of these requirements to varying degrees. However, there is still a definite need for a practical antistatic agent which is effective at low concentrations and has good heat stability so that its effect is not destroyed during the processing steps.

The present invention is based on the discovery that the new quaternary alkyl ammonium ethers defined by Formula I meet the stated requirements for useful antistatic agents. Thus, members of this class are highly active in polyolefins and polyvinyl chloride at low concentrations. The antistatic agents of this invention are effective even at concentrations as low as about 0.1% based on the weight of the polymer. Higher concentrations up to about 5% are also useful for specialized requirements. For normal applications, they are used in concentrations of 0.3% to 2.0%. The matter of choosing a concentration to fit a particular need will be easily dealt with by the ordinarily skilled artisan.

A surprising feature of the antistatic agents of this invention is their uniquely high thermal stability. As stated above, heat stability is an important requirement for useful plastic antistatics. The compounds of this invention are definitely superior in this respect to previous commercial antistatic compounds. This property can be demonstrated in different ways, such as by noting the discoloration or decomposition of a plastic composition containing the antistatic compound. In some instances, when the composition containing the antistatic compound is subjected to progressively increasing temperatures, the antistatic agent accelerates the decomposition of the plastic. With the agents of this invention, this effect is greatly minimized.

Several methods are available for evaluation of the compounds of the invention as antistatics. Molded or extruded formulations of the polymers containing a known amount of the antistatic agents are prepared and these are then evaluated for heat stability and surface resistivity.

The compounds of the invention are conveniently prepared by a method which consists of reacting an alcohol of suitable chain length with epichlorohydrin to form a 2-hydroxy-3-chloropropyl ether, treating this product with sodium hydroxide to form the glycidyl ether, reacting this ether with an alkanolamine to form a dihydroxyethyl tertiary amine, which is then quaternized to the desired product.

Among the starting alcohols that may be employed in the preparation of compounds of this invention are included 1-octanol; 2-octanol; 2-ethyl hexanol; 2-methyl-2-octanol; 1-nonanol; 2-nonanol; 3-nonanol; 4-nonanol; 5-nonanol; 2-methyl-1-nonanol; 2,8-dimethyl-5-nonanol; 1-decanol; 4-decanol; 1-hendecanol; 2-hendecanol; 1-dodecanol; 6-dodecanol; 1-tridecanol; 1-tetradeconal; 1-pentadecanol; 1-hexadecanol; 1-heptadecanol; 1-octadecanol; methylcyclohexanol; ethylcyclohexanol; propylcyclohexanol; butylcyclohexanol; pentylcyclohexanol; hexylcyclohexanol; heptylcyclohexanol; octylcycohexanol; nonylcyclohexanol; decylcyclohexanol; hendecylcyclohexanol; dodecylcyclohexanol; etc.

The acohol containing a suitable amount of a Lewis acid catalyst such as stannic chloride, aluminum chloride, zinc chloride, etc., preferably stannic chloride, said amount being from about 0.1 to about 1.0%, preferably 0.25 to 0.75%, based on the weight of the starting alcohol, is stirred at room temperature while adding epichlorohydrin slowly over a period of about two hours. The temperature and rate of epichlorohydrin addition may vary over wide limits but the indicated conditions tend to minimize color formation, by-product formation, volatilization of starting materials as well as optimize reaction control. The molar ratio of alcohol to epichlorohydrin theoretically required is 1:1. However, to minimize the possibility of reaction of more than one mole of epichlorohydrin with the same molecule of alcohol, it is preferred to employ the alcohol in excess of from about 5 to 50 mole percent, preferably 10–35 mole percent excess.

After completion of the addition of the epichlorohydrin to the starting alcohol as described above, the reaction mixture is heated to from about 70–150° C., preferably 90–110° C. for from about one to four hours, preferably two to three hours and then cooled. At this point an almost colorless oil is obtained.

The product obtained above, with or without purification (it contains excess alcohol) is treated with sodium hydroxide in a suitable organic solvent, the amount of said alkali being that which is equivalent to the amount of epichlorohydrin used. Suitable inert organic solvents are petroleum hydrocarbons, ethers, benzene, toluene, xylene, ketones, etc. The inert solvent should have a boiling point in excess of about 80° C. Di-n-butyl ether has been used successfully (B.P.=142° C.). The amount of solvent present may vary widely, from about 100 to about 200% based on the weight of the reaction mixture obtained from the first step in the procedure. The reaction mixture is heated at from about 70 to 130° C., preferably 80–110° C. for from about two to four hours, preferably 2.5 to 3.5 hours. The mixture is then cooled, filtered, washed with water and dried over anhydrous sodium sulfate. The mixture is then heated to evaporate the solvent, after which the residue is distilled at reduced pressure. The cut with appropriate boiling range at the pressure employed is collected and cooled. The product, generally a colorless light oil, is the glycidyl ether.

The glycidyl ether obtained above is reacted by stirring with an alkanolamine in about equal molar proportions. When the exotherm has subsided, the mixture is cooled. The product, generally a viscous colorless oil, is the tertiary amine substituted ether.

Useful amines for preparing the above amine-substituted ethers are di-($\beta$-hydroxyalkyl)amines in which the alkyl groups have 1–6 carbons. Especially useful are secondary amines having either hydroxyethyl or hydroxypropyl substituents.

At this point if an alkylene oxide adduct is desired, the amine substituted ether is reacted with ethylene or propylene oxide under conventional conditions for the preparation of alkylene oxide adducts. About 2–20 moles of the oxide is reacted per mole of ether.

The tertiary amine ether obtained above is quaternized with a suitable agent such as methylchloride, ethyl chloride, dimethyl sulfate, diethyl sulfate, etc. The amount of quaternizing agent is generally equimolar to the amount of tertiary amine ether present but a slight deficiency of such agent may be used to avoid the presence of unreacted quaternizing agent in the final product. The quaternization is carried out in the presence of a suitable inert organic solvent as previously described such as acetone. With acetone as the solvent, heating to reflux temperature is adequate for this reaction. The solvent is then removed to give the desired hydroxyalkyl quaternary ammonium ether, generally as a white wax.

The preferred quaternizing agent is dimethyl sulfate. The preferred anions of the quaternary compounds are methosulfate and fluoroborate. The former is obtained directly when dimethyl sulfate is the quaternizing agent; the latter is obtained by anion exchange using an appropriate salt of the desired acid or by reacting the quaternary with alkali to obtain the free base and then acidifying with appropriate acid.

The invention is further illustrated by the examples which follow.

EXAMPLE 1

N - [3 - (4 - nonylcyclohexyloxy) - 2 - hydroxypropyl]-N,N - bis(2 - hydroxyethyl) - N -methyl ammonium methosulfate A mixture of 276 g. of nonylcyclohexanol and 1.0 g. of stannic chloride is stirred in a suitable reactor maintained at 25° C. while adding 92.5 g. of epichlorohydrin over a period of two hours. When addition is complete, the reaction mixture is warmed to 100° C., held at this temperature for two hours and then cooled. An almost colorless oil results.

The above mixture is treated with 50 g. of sodium hydroxide pulverized in 500 cc. of di-n-butyl ether. The mixture is heated to 90° C., held at this temperature for three hours, cooled and filtered. The filtrate is washed with water and dried over anhydrous sodium sulfate.

The dried filtrate is placed in a reactor equipped for vacuum distillation, and then heated. The solvent is removed and then the cut boiling at 140–145° C. at a pressure equivalent to 0.15 mm. of mercury is collected. The product is a colorless light oil.

A mixture of 282 g. of the product obtained above and 105 g. of diethanolamine is stirred while heating on a steam bath. An exotherm occurs which causes the temperature to rise to 135° C. When the exotherm subsides, the product is cooled and obtained as a colorless viscous oil.

To 193 g. of the above product is added 63.0 g. of dimethyl sulfate in 500 cc. of acetone. The solution is heated to reflux and immediately cooled. The solvent is removed by heating on a steam bath. The product is a white wax.

The sequence of reactions is illustrated by the following equations wherein $R_1$ is the radical of the Formula II:

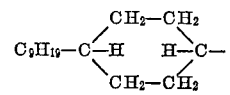

(1) 

(2) 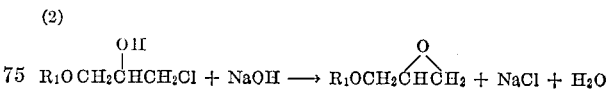

(3)

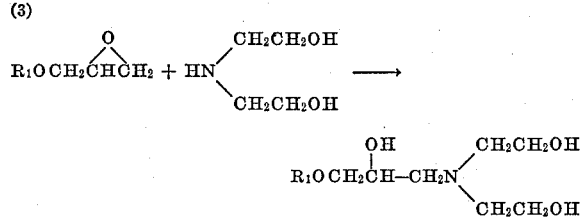

(4)

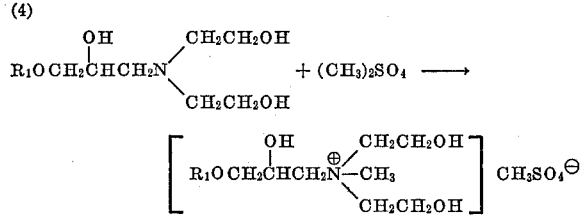

The corresponding ethylene oxide adduct with 10 moles of the oxide is prepared from one mole of N-[3-(4-nonylcyclohexyloxy) - 2 - hydroxypropyl]-N,N-bis(2-hydroxyethyl)-N-methyl ammonium methosulfate by bubbling in about 12.5 moles of the oxide under slightly elevated pressure. The rate of addition is such that the reaction mixture is maintained at moderate reflux temperature.

EXAMPLE 2

N-(3-dodecyloxy-2-hydroxypropyl)-N,N-bis(2-hydroxyethyl)-N-methylammonium methosulfate The procedure of Example 1 is followed except that the equivalent amount of 1-dodecanol is substituted for the nonylcyclohexanol. A wax-like product is obtained.

In a similar series of reactions substituting for the starting alcohol, the proper amount of indicated alcohol, there are obtained the various products of Formula I.

The products derived from octanol and stearyl alcohol are wax-like materials similar in appearance to the product of Example 2.

EXAMPLE 3

Additives of this invention are incorporated into a copolymer of 80% vinyl chloride and 20% vinyl acetate at various concentrations by milling on a two-roll laboratory mill at 175° C. for five minutes. The milled sheets obtained are compression-molded at 170–175° C. and under 24 tons pressure into plaques 2 x 2½ x 0.050 inches. Antistatic properties are determined at 50, 40 and 20% relative humidity (R.H.) using surface resistivity measurements and are shown in Table I. For comparison, samples with no additive (control) and a similar concentration of lauramidopropyldimethyl-β-hydroxyethyl ammonium methosulfate, a commercial antistatic agent, are also tested. Thermal stability is measured by the degree of discoloration of the polymer observed during milling and oven-aging at 175° C. and is shown in Tables II and III in comparison to the same commercial antistatic agent.

TABLE I

| Additive | Concentration (percent) | Surface resistivity (megohms) | | |
|---|---|---|---|---|
| | | 50% R.H. | 40% R.H. | 20% R.H. |
| Example 2 | 1.5 | 40×10 | N.T. | N.T |
| | 0.5 | 17×10² | 60×10 | 30×10³ |
| | 0.3 | 58×10² | 11×10³ | 60×10³ |
| Example 1 | 1.5 | 82×10 | N.T. | N.T. |
| | 0.5 | 22×10² | 52×10² | 61×10³ |
| | 0.3 | 11×10⁴ | 16×10⁴ | 90×10⁴ |
| Comparable commercial antistatic. | 1.5 | 40×10 | N.T. | N.T. |
| | 0.5 | 20×10⁷ | N.E. | N.E. |
| | 0.3 | N.E. | N.E. | N.E. |

N.T. means "not tested."
N.E. means "not effective."

TABLE II
[Thermal stability at 175° C., mill aging, 175° C., 1.5% antistatic]

| Milling time (min.) | Discoloration | | |
|---|---|---|---|
| | $R=C_{12}H_{25}-$ | $R=C_9H_{19}-\langle S \rangle-$ | Commercial |
| 5 | Trace yellow | Trace yellow | Trace yellow. |
| 10 | Very light yellow | Very light yellow | Very light yellow. |
| 15 | Light yellow | Light yellow | Light yellow. |
| 20 | Yellow | Yellow | Dark yellow. |
| 23 | N.T | N.T | Very dark yellow-orange. |
| 25 | Yellow-orange | Yellow-orange | N.T. |
| 30 | Dark yellow-orange | Dark yellow-orange | N.T. |

TABLE III

| Compound | Oven Aging, 175° C. VYNS (formula as above) discoloration after number of minutes | | | |
|---|---|---|---|---|
| | 6 | 12 | 18 | 24 |
| $R=C_{12}H_{25}$ | Light yellow | Yellow | Yellow-orange | Dark red. |
| $R=C_9H_{19}-\langle S \rangle-$ | Very light yellow | Yellow | Yellow-orange | Dark red. |
| Commercial | Light yellow | Dark orange | Black | N.T. |

EXAMPLE 4

When the additive of Example 2 was tested in rigid PVC by the procedure of Example 3, the following results were obtained.

0.3% additive _____ $R=C_{12}H_{25}$
Y.I. _____ 8
50% R.H. _____ 15×10²
40% R.H. _____ 34×10²
30% R.H. _____ 16×10³
20% R.H. _____ 13×10⁴

EXAMPLE 5

Rigid PVC pigmented with 5.0% $TiO_2$ was evaluated by the procedure of Example 3 using the additive of Example 2. The following results were obtained.

0.5% antistatic agent _____ $R=C_{12}H_{25}$
Yellow index _____ 1
Resistivity (megohms):
    50% R.H. _____ $12 \times 10^2$
    40% R.H. _____ $10 \times 10^3$
    20% R.H. _____ $36 \times 10^4$

We claim:
1. Hydroxyalkyl quaternary ammonium ethers of the formula:

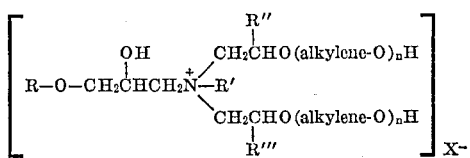

wherein R is an alkyl radical of from 8-19 carbon atoms or cycloalkyl of 5-6 carbons said cycloalkyl being unsubstituted or substituted with alkyl substituents of 1-19 carbons; R' is alkyl of 1-3 carbon atoms; R'' and R''' are individually either hydrogen or alkyl of 1-4 carbon atoms; "alkylene" has 2-3 carbons; $n$ is a number between zero and ten inclusive; and X is an anion.

2. The compound N - [3-(4-nonylcyclohexyloxy)-2-hydroxypropyl] - N,N - bis(2 - hydroxyethyl)-N-methyl ammonium methosulfate.

3. The compound N - (3-dodecyloxy - 2 - hydroxypropyl) - N,N - bis(2-hydroxyethyl) - N - methylammonium methosulfate.

References Cited
UNITED STATES PATENTS 3,102,839    9/1963    Neracher et al. __ 260—567.6 X
3,141,905    7/1964    Longley _____ 260—567.6 X LEON ZITVER, Primary Examiner L. D. CRESCENTE, Assistant Examiner